United States Patent Office 2,702,752
Patented Feb. 22, 1955

2,702,752

PLASTIC INSULATING REFRACTORY COMPOSITION

Joseph R. Parsons, Park Forest, Ill., assignor to Chicago Fire Brick Company, Chicago, Ill., a corporation of Illinois No Drawing. Application August 26, 1953,
Serial No. 376,760

3 Claims. (Cl. 106—67)

The invention relates to insulating refractory plastics and methods of producing same. More particularly the invention relates to perlite insulating refractory plastic compositions.

Expanded perlite is a light weight fragile aggregate used extensively in light weight plasters and concrete, and also in relatively low temperature (below 2000° F.) heat insulation when combined with suitable materials.

It is an object of this invention to show how expanded perlite or other similar fragile low melting aggregate can be used to produce refractory insulating materials capable of service above 3000° F.

Another object of this invention is to provide a perlite refractory plastic composition which can be shaped into bricks or the like and used either with or without firing at high temperatures, for example, above 3000° F.

A further use of this invention is for the extrusion of light weight clay products. Clay by its very nature is extremely tough and usually requires tremendous pressures to reduce the material to a thoroughly blended plastic mass. The most common methods of developing a plastic clay for extrusion are two: first, the use of heavy muller wheels from 1000 to 8000 lbs. in weight to work the water into the clay particles; or second, to pug the mass by driving heavy steel blades through the clay until it is a homogeneous plastic material. The back thrust against the bearings of the extruding machines used sometimes runs about 100 tons pressure.

It is easy to see that with such methods in common use, a fragile aggregate such as perlite (which can be crushed easily between the fingers of the hand) would produce no lightening effect whatsoever after being passed through standard clay working equipment.

A further object of this invention is to provide a method of producing a plastic extrudable composition containing a uniform mixture of perlite and clay without first passing through the usual muller or pugging methods of mixing today prevalent in the mixing of ceramic ware.

Another object is to provide an insulating clay-containing plastic which is practically free of drying shrinkage or firing distortion, and is capable of forming a high temperature insulating body serviceable to approximately the melting point of the clay used.

Another object is to provide a refractory insulating plastic capable of being used as a lining of bright annealing furnaces where sulphur gases would damage the ware.

Another object is to provide an insulating plastic refractory composition useful as a lid on soaking pits in the steel industry.

To accomplish these objects three major difficulties have to be overcome. First, the fragility of the aggregate due to its extreme lightness (6 to 10 lbs. per cu. ft.) does not allow suitable mixing with clay for stiff plastic products. For this reason, it is necessary to deflocculate the clay to produce the lightest refractory insulating plastics, although other methods can be used when the maximum insulation value is not desired. This is discussed in greater detail in the body of this application.

Second, due to the high flux content of the perlite, it is completely absorbed by the body of the mix when the product is used above 1600° F. This necessitates the surrounding of each aggregate particle by an extremely refractory material which is capable of absorbing these fluxes and still retaining a refractory serviceable mass.

Third, the development of ceramic bond or glasses in ceramic ware is generally followed by shrinkage as the body tends to draw towards a common center. In the case of insulating materials, where there are no dense aggregates to control this shrinkage, shrinkage is so excessive as to render the product useless in service. However, in my invention, I add an expanding agent to counteract these shrinkages and produce a stable body in service. For this shrinkage control, I have found silica or kyanite are satisfactory. In the development work, it was found that kyanite was the better of the two at temperatures above 2450° F.

In accordance with this invention, clay such as kaolin or the like is mixed with water and preferably, in the case of high temperature insulation, with an expansion agent such as pulverized quartz or kyanite. The aqueous composition is then deflocculated by adding a suitable deflocculating agent such as a small quantity of sodium silicate, sodium carbonate, ammonium hydroxide, sodium hydroxide, or other soluble salts which supply monovalent ions rather than acid ions. The resulting deflocculated composition should have a consistency so that it can be readily poured and so it can be readily mixed with perlite. The perlite is added and uniformly mixed into this fluid clay slurry. To this uniform mixture is then added a small amount of a flocculating agent, for example, from .25% to .5% of the clay content.

The order of the mixing may be varied, for example, improved uniformity is obtained by adding the deflocculating agent to the clay perlite water slurry without the kyanite, and then later adding the kyanite with the flocculating agent.

It is also possible to make a dry mixture of the refractories containing both the deflocculating agent and a delayed action flocculating agent, and then add water. The mixture first deflocculates so it can be readily poured and then sets up into a plastic mass as the delayed flocculating action takes place. Delayed flocculation can be obtained by using flocculating agents which are slowly soluble in water or by using flocculants of coarse particle size.

Flocculating agents are well known in the art and are described in detail in my Patent No. 1,954,889, granted April 17, 1934. As is set forth in this patent, suitable flocculating agents are acids which furnish H+ ions and salts of di- or trivalent metals which give ions of those metals. A particularly advantageous flocculating agent is calcium sulfate or gypsum, but other agents which are also satisfactory are aluminum sulfate, calcium sulfide, calcium hydroxide, zinc sulfate and sulphuric acid.

The amount of flocculating agent may be varied widely depending upon the amount of time desired to produce flocculation. A delayed flocculation of a few minutes to several hours is desirable when the composition is to be poured into a mold in order to provide time for handling and pouring.

In one embodiment of my invention, the amount of water present in the flocculated composition is such that the product is a plastic putty-like mass which can be readily pressed into any desired shape. This composition may be packed and shipped in bags, preferably bags or containers made of a flexible, transparent, moistureproof, organic plastic sealed to prevent loss of moisture.

The flocculated composition may be used as a furnace patching composition, or it may be formed into any desired shape and immediately used under high temperature surface conditions. Thus drying and firing are avoided, although these operations may be carried out, particularly where it is desired to use the composition in the form of insulating bricks. In this case the composition is air dried at about 212° F. and after drying it is fired for a period of 14 to 16 hours at a temperature ranging from 2000° F. to 2500° F.

The practical size of the materials used is not particularly important although generally it is desirable to use expanded perlite running from 6 mesh to finer, kaolin preferably running 95% through a 325 mesh screen, although closer or finer, mesh may be used; and kyanite of 35 mesh and finer.

The proportions of ingredients may be varied widely, depending upon the type of refractory insulating material desired.

In general, the amount of clay should not be substantially less than 30% or greater than 80% and the perlite not substantially less than 5% or greater than 50% by weight of the total aggregate with flocculating and deflocculating agents present in minor amounts. Kyanite should preferably be used for high temperature insulating refractories but can be omitted and replaced by quartz for low temperature refractories. The plastic putty-like composition may contain water from approximately 20 to 175% by weight on the basis of the dry ingredients.

The following Tables I, II and III give the preferred and operable range of ingredients for producing insulating refractory bodies which will stand up under high and low temperature service conditions.

*Table I*

| | Operable Range | Preferred |
|---|---|---|
| Service range 2,600 to 3,100° F.: | | |
| Perlite concrete grade_____percent__ | 5-20 | 12 |
| Kaolin or ball clay_____do____ | 30-60 | 48 |
| Kyanite_____do____ | 20-60 | 40 (35 mesh) |
| Water in lbs./100 lbs. of dry mix_____ | 25-50 | 36 |
| Sodium silicate or other deflocculants percent__ | .25-3 | .5 |
| Aluminum sulfate or other flocculant percent__ | 1. to 5 | 2. |
| Dried weight of plastic/cu. ft_____lbs__ | 58 to 92 | 64 |
| Fired weight of plastic/cu. ft_____lbs__ | 45 to 85 | 60 |

*Table II*

| | Operable Range | Preferred |
|---|---|---|
| Service Range, 1,800 to 2,600° F.: | | |
| Perlite concrete grade_____percent__ | 10-30 | 17 |
| Kaolin or ball clay_____do____ | 30-70 | 58 |
| Kyanite_____do____ | 15-35 | 25 (35 mesh) |
| Water in lbs./100 lbs. of dry mix_____ | 30 to 75 | 42 |
| Sodium silicate or other deflocculants percent__ | .25 to 3 | .5 |
| Aluminum sulfate or other flocculants percent__ | 1. to 5 | 2.0 |
| Dried weight of plastic/cu. ft_____lbs__ | 42-65 | 53 |
| Fired weight of plastic/cu. ft_____lbs__ | 40-60 | 50 |

*Table III*

| | Operable Range | Preferred |
|---|---|---|
| Service range 1,000 to 1,800° F.: | | |
| Bentonite_____percent__ | 0-20 | 10 |
| Perlite_____do____ | 20-50 | 40 |
| Kaolin ball clay_____do____ | 50-80 | 50 |
| Silica_____do____ | 0-30 | |
| Water in lbs./100 lbs. of dry mix_____ | 75 to 175 | 112 to 125 |
| Sodium silicate or other deflocculants percent__ | .25 to 3 | .5 |
| Aluminum sulfate or other flocculants percent__ | 1 to 5 | 2 |
| Dried weight plastic/cu. ft_____lbs__ | 23 to 55 | 27 |
| Fired weight plastic/cu. ft_____lbs__ | 20 to 50 | 25 |

What I claim and desire to secure by Letters Patent is:

1. A plastic composition of putty-like consistency consisting essentially of 5 to 20% by weight of perlite, 30 to 60% by weight of clay, 20 to 60% by weight kyanite, a deflocculating and flocculating agent, and from 25 to 50% by weight of water, all of said percentages being on the basis of the total dry ingredients, said deflocculating agent being present in sufficient amount to form a composition of slurry-like consistency in the absence of said flocculating agent, and said flocculating agent being present in sufficient amount to render said composition of putty-like consistency in the presence of said deflocculating agent.

2. A plastic composition of putty-like consistency consisting essentially of 10 to 30% by weight of perlite, 30 to 70% by weight clay, 15 to 35% by weight kyanite, a deflocculating and flocculating agent, and 30 to 75% by weight of water, all of said percentages being on the basis of the total dry ingredients, said deflocculating agent being present in sufficient amount to form a composition of slurry-like consistency in the absence of said flocculating agent, and said flocculating agent being present in sufficient amount to render said composition of putty-like consistency in the presence of said deflocculating agent.

3. A plastic composition of putty-like consistency consisting essentially of 20 to 50% by weight of perlite, 50 to 80% clay, deflocculating and flocculating agents, and 75 to 175% by weight of water, all of said percentages being on the basis of the total dry ingredients, said deflocculating agent being present in sufficient amount to form a composition of slurry-like consistency in the absence of said flocculating agent, and said flocculating agent being present in sufficient amount to render said composition of putty-like consistency in the presence of said deflocculating agent.

References Cited in the file of this patent

UNITED STATES PATENTS

| 2,400,087 | Harth | May 14, 1946 |
| 2,462,538 | Nagel | Feb. 22, 1949 |

FOREIGN PATENTS

| 159,737 | Great Britain | 1921 |